United States Patent [19]

Ito

[11] Patent Number: 4,947,206

[45] Date of Patent: Aug. 7, 1990

[54] COPYING APPARATUS

[75] Inventor: Masazumi Ito, Osaka, Japan

[73] Assignee: Minolta Camera Kabushiki Kaisha, Osaka, Japan

[21] Appl. No.: 288,134

[22] Filed: Dec. 22, 1988

[30] Foreign Application Priority Data

Dec. 25, 1987 [JP] Japan ............................... 62-333395

[51] Int. Cl.[5] ............................................. G03B 27/52

[52] U.S. Cl. ...................................... 355/55; 355/243; 355/308; 355/321; 355/57

[58] Field of Search ........................ 355/55, 56, 57, 72, 355/321, 308, 243

[56] References Cited

U.S. PATENT DOCUMENTS 3,288,459 11/1966 Hitchcock et al. .
3,684,373 8/1972 Berge et al. .
3,689,143 9/1972 Case et al. .
4,052,054 10/1977 Cardwell et al. .
4,108,427 8/1978 Komori et al. .
4,277,163 7/1981 Ikesue et al. .
4,277,165 7/1981 Wada et al. .
4,440,487 4/1984 Miura .
4,455,081 6/1984 Yoshimura et al. .
4,505,579 3/1985 Furuichi .
4,537,497 8/1985 Masuda .
4,575,227 3/1986 Ito et al. .
4,595,273 6/1986 Watanabe et al. .
4,607,946 8/1986 Uchiyama et al. .
4,615,610 10/1986 Yoshiura .
4,634,263 1/1987 Miwa .
4,647,188 3/1987 Komiya et al. .
4,669,858 6/1987 Ito et al. .
4,721,381 1/1988 Matsuo .
4,727,401 2/1988 Partilla et al. .
4,731,637 3/1988 Acquaviva et al. .
4,771,319 9/1988 Hamakawa .
4,772,921 9/1988 Ito .
4,775,139 10/1988 Honjo et al. .
4,777,511 10/1988 Takahashi .
4,796,056 1/1989 Ito .
4,809,050 2/1989 Ito .
4,814,825 3/1989 Johdai et al. .
4,831,413 5/1989 Hamakawa .

FOREIGN PATENT DOCUMENTS 60-2942 1/1985 Japan .
60-93463 5/1985 Japan .
60-84945 6/1985 Japan .
61-196263 8/1986 Japan .

OTHER PUBLICATIONS

IBM Technical Disclosure Bulletin, vol. 17, No. 9, Feb. 1975, pp. 2690-2690A.

*Primary Examiner*—Monroe H. Hayes
*Attorney, Agent, or Firm*—Burns, Doane, Swecker & Mathis

[57] ABSTRACT

A copying apparatus has a paper size automatic selection function for automatically selecting papers of any desired size in a plurality of available sizes. The copying apparatus is provided with a plurality of paper supply cassettes each accommodating a plurality of copy papers, an original size detector sensor for detecting the size of an original document to be copied, a plurality of copy paper size detector switches for detecting the size of the copy papers accommodated in the paper supply cassettes, a plurality of magnification setting keys for setting a desired magnification ratio, a plurality of reference tables, a plurality of selector switches for selecting a desired reference table in accordance with the detected size of the original document and a control system. Each of the reference tables indicates the relationship among sizes of original documents, magnification ratios and sizes of copy papers. The control system includes a plurality of microprocessors for determining the size of copy papers appropriate to the detected size of the original document to be copied and the selected magnification ratio on the basis of the selected reference table so that the copy papers of the desired size may be supplied from the selected paper supply cassette.

11 Claims, 19 Drawing Sheets

COPYING APPARATUS

Field of the Invention

1. The present invention relates to a copying apparatus having a paper size automatic selection function for automatically selecting papers of any desired size in a plurality of available sizes.

2. Description of the Related Art

Some of copying apparatuses have a paper size automatic selection function for automatically selecting papers of a desired size in accordance with the size of an original document and the magnification ratio.

The paper size varies in different localities, which can be broadly classified into two groups, the localities employing the metric system of unit and those employing the inch system of unit. Accordingly, the copying apparatuses having the paper size automatic selection function are each provided with a reference table or tables which are used for paper selection and correspond to respective localities. The desired papers are selected by making reference to these reference tables in accordance with the original size and the magnification ratio.

The internationalization of enterprises is promoted in these years. Because of this, some commercial firms in Japan or some enterprises having American nationality in Europe frequently use both of original documents or papers produced on the basis of the inch system of unit and those produced on the basis of the metric one. Furthermore, some offices accommodate a number of men having different nationalities, resulting in the increased kind of papers to be used.

Under such circumstances, the copying apparatuses are necessarily required to comply with original documents and papers based on different systems of unit or used in different localities.

On the other hand, users in an office would feel inconvenience unless the paper sizes most used in the office are placed before those most used in other areas. The users, for the most part, expect that each original document will be copied on a copy paper of a size frequently used in their offices.

SUMMARY OF THE INVENTION

Accordingly, the present invention has been developed with a view to substantially eliminating the above described disadvantages inherent in the prior art copying apparatus, and has for its essential object to provide an improved copying apparatus having a paper size automatic selection function in which papers of various sizes can be used without any troublesome manipulation.

In accomplishing this and other objects, a copying apparatus according to one preferred embodiment of the present invention has a paper size automatic selection function for automatically selecting papers of any desired size in a plurality of available sizes and is characterized by a photosensitive member, an image forming means for forming an image of an original document on the photosensitive member to transfer the image onto a copy paper, a plurality of paper supply means each accommodating a plurality of copy papers for supplying the copy papers one at a time to the image forming means, an original size detecting means for detecting the size of the original document to be copied, a copy paper size detecting means for detecting the size of the copy papers accommodated in the paper supply means, a magnification selecting means for selecting a desired magnification ratio, a first reference table for indicating the relationship among sizes of original documents based on the inch system of unit, the magnification ratios and sizes of copy papers based on the inch system of unit, a second reference table for indicating the relationship among sizes of original documents based on the metric system of unit, the magnification ratios and sizes of copy papers based on the metric system of unit, a table selecting means for selecting either one of the reference tables, and a control means for determining the size of copy papers appropriate to the detected size of the original document and the selected magnification ratio on the basis of the selected reference table to thereby select the paper supply means accommodating the copy papers of the desired size.

Accordingly, any user can selectively use papers of any desired size from among those of a plurality of available sizes on the basis of either one of the first and second reference tables.

In another aspect of the present invention, the copying apparatus is further provided with a third reference table for indicating the relationship among sizes of original documents based on the inch and metric systems of unit, the magnification ratios and sizes of the copy papers based on the inch and metric systems of unit.

The user can, therefore, readily select papers of any desired size even in an area in which both of papers produced on the basis of the inch system of unit and those produced on the basis of the metric system of unit are used.

BRIEF DESCRIPTION OF THE DRAWINGS

This and other objects and features of the present invention will become more apparent from the following description taken in conjunction with the preferred embodiment thereof with reference to the accompanying drawings, throughout which like parts are designated by like reference numerals, and in which.

DETAILED DESCRIPTION OF THE PREFERRED EMBODIMENT

Referring to the accompanying drawings, one preferred embodiment of the present invention will be hereinafter discussed in the following order.

(a) Construction of a Copying Apparatus
(b) Operation Panel
(c) Paper Size Automatic Selection Function and Selection of Reference Tables for Paper Search Use
(d) Construction of a Control Portion of the Copying Apparatus
(e) Operation of the Copying Apparatus
  (e-1) Main Routine
  (e-2) User's Paper Selection and Paper Empty Display
  (e-3) Copying Operation
  (e-4) Paper Size Automatic Selection (including Table Automatic Selection)
(f) Operation of an Automatic Document Feeder It is to be noted that papers mainly used in this embodiment are those produced on the basis of the metric system of unit.

(a) Construction of a Copying Apparatus

Figure 1:
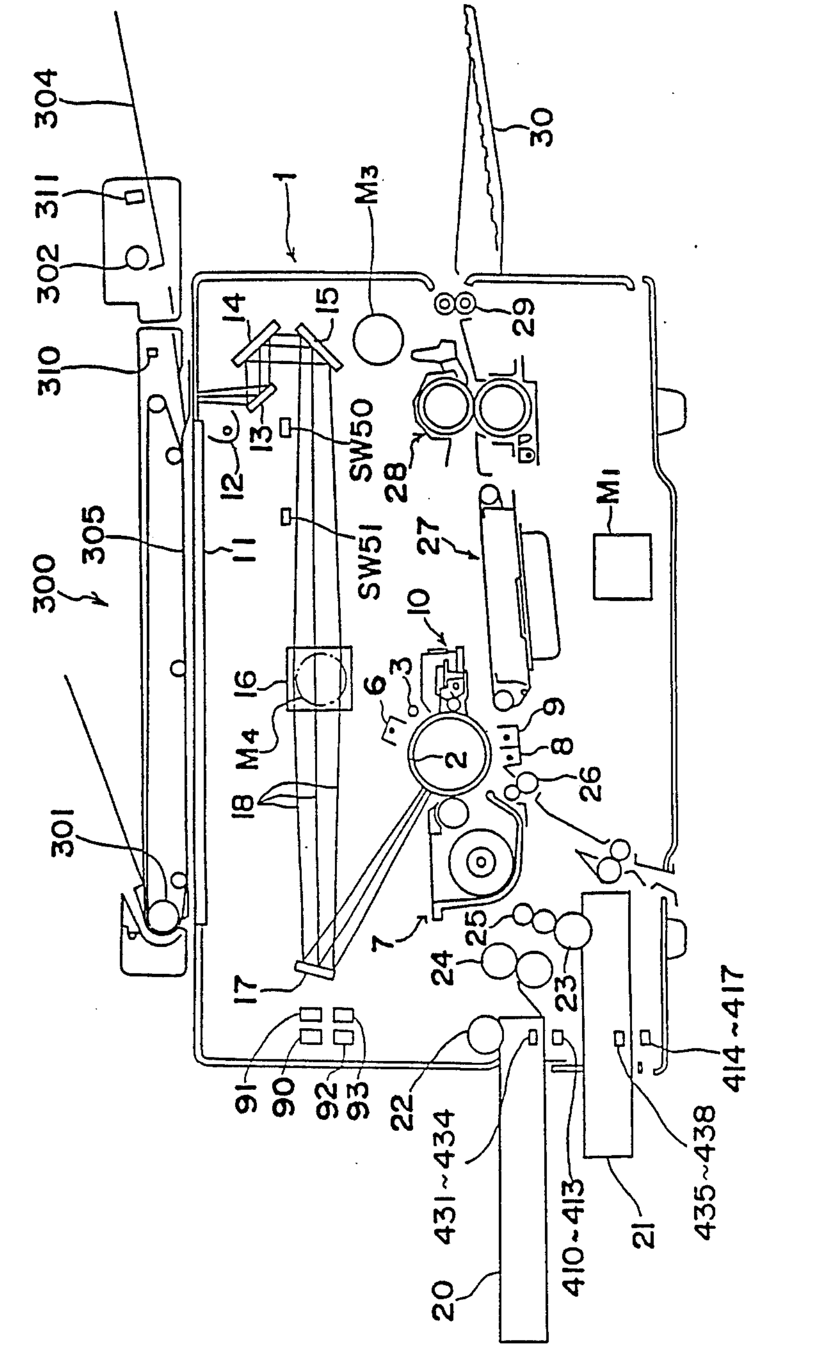
FIG. 1 is a schematic sectional view of an electrophotographic copying apparatus according to the present invention.

Referring first to FIG. 1, an electrophotographic copying apparatus to which the present invention is applied is substantially the same as the conventional apparatus. The copying apparatus comprises a photosensitive drum 2 supported at a generally central portion within an apparatus body 1 for rotation in a direction counterclockwise as viewed therein. The copying apparatus also comprises a main eraser lamp 3, a main electrostatic charger 6, a developing unit 7, a transfer charger 8, a separation charger 9 for facilitating the separation of a transfer paper from the drum 2 and a blade-type cleaning unit 10, all disposed adjacent to and around the drum 2 within the apparatus body 1. The photosensitive drum 2 has a photosensitive layer of, for example, selenium at its peripheral surface and is exposed to light emitted from the main eraser lamp 3 during each copying operation. The drum 2 is then electrostatically charged by the main charger 6 in readiness for its exposure to an image transmitted by means of an optical system. An electric motor Ml located at a lower portion inside the apparatus body 1 drives the photosensitive drum 2 and the like.

The optical system is disposed underneath a original support glass 11 for scanning an original document placed on the original support glass 11 from below. The optical system comprises a light source 12, a first mirror 13, a second mirror 14, a third mirror 15, a projector lens assembly 16 and a fourth mirror 17. An image formed on the original document is transmitted by the optical system as shown by solid lines 18 and reaches the drum 2. A position detector switch SW50 is provided for detecting whether or not the optical system is located at its proper position prior to the scanning. The optical system is driven by an electric motor M3. The magnification ratio is set by moving the projector lens assembly 16 in a direction of an optical axis by the operation of an electric motor M4 drivingly coupled thereto. The light source 12 and the mirrors 13 to 15 are adapted to be driven by the motor M3 in such a way that both the light source 12 and first mirror 13 and both the second and third mirrors 14 and 15 can be moved leftwards, as viewed in FIG. 1, at a predetermined speed of (v/n) and at a predetermined speed of (v/2n), respectively, wherein v represents the peripheral speed of the drum 2 which is fixed regardless of the magnification ratio and n represents the magnification ratio. Upon such movement of the light source 12 and the mirrors 13 to 15, the image is successively transmitted onto the drum 2 from the fourth mirror 17.

The copying apparatus is provided at a left-hand portion of its body 1 with paper supply cassettes 20 and 21 adjacent to respective paper supply rollers 22 and 23. Copy papers accommodated in the paper supply cassettes 20 and 21 are selectively supplied into the apparatus body 1 by respective rollers 22 and 23. The path of travel of each copy paper is defined by transport roller pairs 24 and 25, a timing roller pair 26, a transfer belt 27, a fixing unit 28 and a discharge roller pair 29. Each copy paper supplied from the paper supply cassette 20 or 21 once stops when it has reached the timing roller pair 26.

At the time of transfer, the copy paper is further transported by the timing roller pair 26 towards the transfer portion 8 where the paper is caused to closely adhere to the drum 2. In this event, a toner image is transferred onto the paper by virtue of corona discharge caused by the transfer charger 8. The paper is then separated from the drum 2 by virtue of corona discharge caused by the separation charger 9 and the elasticity of the paper itself. Thereafter, the paper is drawn by the transfer belt 27 and transported rightwards upon rotation of the transfer belt 27 in a direction clockwise as viewed in FIG. 1. To this end, the transfer belt 27 is provided with an air suction means (not shown). The paper then passes the fixing unit 28 and the discharge roller pair 29 and is discharged onto a paper discharge tray 30 or a sorter (not shown). The fixing unit 28 is provided for fusing and fixing the toner image. The paper discharge tray 30 is hingedly connected at its one end with a right-hand side portion of the apparatus body 1 or detachably mounted therein.

Paper size detector switches 410 to 413 and 414 to 417 are reed switches adjacent to the paper supply cassettes 20 and 21, respectively, and detect the size of papers accommodated in the paper supply cassettes 20 and 21 by detecting magnets 431 to 434 and 435 to 438 provided therein. The sizes of papers which can be set in the paper supply cassettes 20 and 21 and to which the copying can be performed are those of A3, A4, A5, B4 and B5, or (17"×11") size, legal size and letter size based on the inch system of unit. The size and the direction of setout of papers are detected by a 4-bit code in compliance with the combination of on and off states of the switches 410 to 413 and 414 to 417 and stored in a RAM accommodated in a first CPU 201 (CPU1) in a control circuit shown in FIG. 4. Codes which represent various paper sizes and are obtained by the combination of on/off states of the switches 410 to 413 are tabulated in Table 1.

TABLE 1

| Decimal Codes | Binary Codes SW413 | SW412 | SW411 | SW410 | Paper Size |
|---|---|---|---|---|---|
| 0 | 0 | 0 | 0 | 0 | |
| 1 | 0 | 0 | 0 | 1 | |
| 2 | 0 | 0 | 1 | 0 | Long. Pos. A4 |
| 3 | 0 | 0 | 1 | 1 | Long. Pos. B4 |
| 4 | 0 | 1 | 0 | 0 | Long. Pos. A3 |
| 5 | 0 | 1 | 0 | 1 | |
| 6 | 0 | 1 | 1 | 0 | |
| 7 | 0 | 1 | 1 | 1 | |
| 8 | 1 | 0 | 0 | 0 | |
| 9 | 1 | 0 | 0 | 1 | |
| 10 | 1 | 0 | 1 | 0 | Long. Pos. Letter |
| 11 | 1 | 0 | 1 | 1 | Long. Pos. Legal |
| 12 | 1 | 1 | 0 | 0 | Long. Pos. (17" × 11") |
| 13 | 1 | 1 | 0 | 1 | |
| 14 | 1 | 1 | 1 | 0 | |
| 15 | 1 | 1 | 1 | 1 | Cassette Empty |

In this table, 0 represents an ON-state of the designated switch whereas 1 represents an OFF-state thereof. When all of the switches 410 to 413 are off, the cassette 20 is not mounted in the apparatus body 1 or does not accommodate any paper.

Table 2 indicates the sizes of original documents which can be detected in this embodiment.

TABLE 2

| Name | Size (unit: mm) | Length (unit: mm) |
|---|---|---|
| 17" × 11" | 432 × 279 (17" × 11") | 432 |
| A3 | 420 × 297 | 420 |
| B4 | 364 × 257 | 364 |
| Legal | 356 × 216 (14" × 8½") | 356 |
| A4 | 297 × 210 | 297 |
| Letter | 279 × 216 (11" × 8½") | 279 |

Referring back to FIG. 1, the copying apparatus is further provided with a DF (Document Feed) unit 300 of an ADF (Automatic Document Feeder) on the original support glass 11. The DF unit 300 accommodates sensors 310 and 311 for detecting whether or not an original document has been fed and for detecting whether or not at least one original document is placed on an original tray 304, respectively.

An electric motor 301 rotates an original transport belt 305 of the DF unit 300 and an electric motor 302 works to feed each original document placed on the original tray 304 towards the original transport belt 305.

In the copying operation, when a print switch 50 provided on an operation panel, which will be later described, is depressed, the automatic document transport function initially works so that the DF unit 300 may feed the original document on the original tray 304 towards the transport belt 305, which further transports the original towards the original support glass 11 and places it in position. During the transportation, the sensor 310 detects the size of the original. In a paper size automatic selection function, data indicative of the size of original is utilized for selection of papers.

Upon completion of transportation of the original, the apparatus body 1 initiates its operation after the transport belt 305 has been brought to a stop. When the ADF is connected with the apparatus, an ADF mode is set by placing the original or originals on the original tray 304. The DF unit 30 is openable with respect to the original support glass 11, since it is hingedly connected at its one end with the apparatus body 1. When the DF unit 300 is opened and an original document is manually placed on the original support glass 11, the ordinary copying operation is performed with the ADF mode released. The releasement of the ADF mode also releases a paper size automatic selection mode, when this mode is set. The reason for this is that the size of original can not be detected after the ADF mode has been released.

(b) Operation Panel

Figure 2:
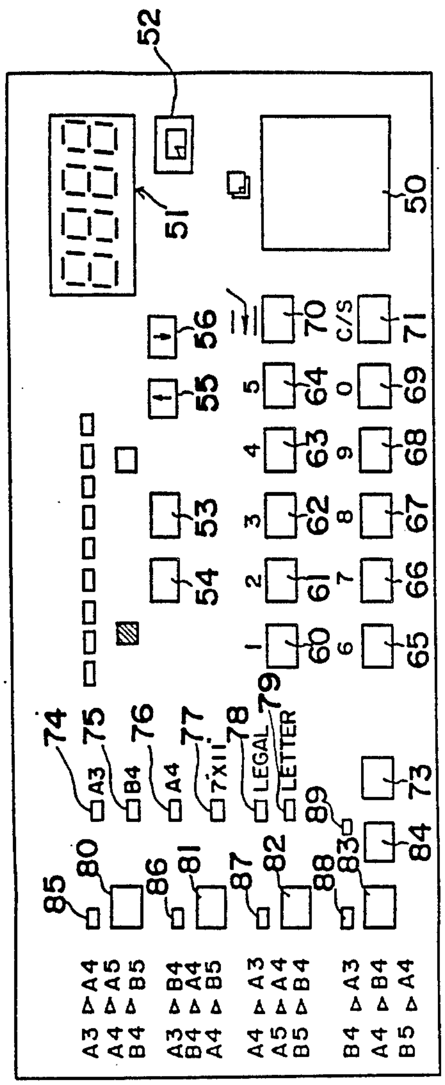
FIG. 2 is a top plan view of an operation panel of the copying apparatus.

FIG. 2 depict an operation panel which is designed for use in Japan. The operation panel is provided with the following various operating keys and the like.

Figure 3:
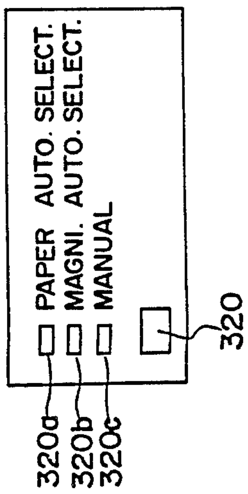
FIG. 3 is a top plan view of an operation panel of an automatic document feeder.

50: print switch for initiating the copying operation
51: a series of LEDs for displaying the number of copies
51: paper empty display
53: key for increasing the amount of exposure
54: key for decreasing the amount of exposure
55: key for increasing the magnification
56: key for decreasing the magnification
60–69: ten-keys for inputting the number of copies etc.
70: interruption key for specifying an interrupted copying operation
71: clear/stop key for stopping the multi-copying and for clearing the inputted numbers
73: paper selector key
74–79: displays indicative of A3, B4, A4, 17"×11" size, legal size and letter size, respectively
80: reduced magnification setting key for setting from A3 to A4
81: reduced magnification setting key for setting from A3 to B4
82: enlarged magnification setting key for setting from A4 to A3
83: enlarged magnification setting key for setting from B4 to A3
84: equal size magnification setting key 85–88: displays indicative of respective setting keys 80–83
89: equal size display FIG. 3 depicts an ADF operation panel provided on the DF unit 300. The ADF operation panel is provided with a selector key 320 and a plurality of LEDs 320*a*, 320*b* and 320*c* for indicating a paper size automatic selection mode, a magnification automatic selection mode and a manual mode, respectively. Whenever the selector key 320 is depressed, the mode to be set varies and any one of the LEDs is accordingly turned on.

(c) Paper Size Automatic Selection Function and Selection of Reference Tables for Paper Search Use In this embodiment, the desired papers are selected on the basis of the selected one of three reference tables A, B and C using the paper size automatic selection function for automatically selecting papers of a desired size in accordance with the original size and the magnification ratio.

One example of the table A which is intended for worldwide use is shown in Table 3. This table A is utilized in areas in which original documents or papers based on the metric system of unit and those based on the inch system of unit are both used. When the original size is B4 and the desired magnification is (×0.707) magnification, the letter size is selected in accordance with the table A. When the original size is the letter one and the desired magnification is (×1.154) magnification, B4-sized papers are selected.

Tables 4 and 5 are examples of Tables B and C, which are utilized in countries (Japan etc.) or areas employing the metric system of unit and those (U.S.A etc.) employing the inch system of unit, respectively.

papers based on different systems of unit are set in the apparatus, the worldwide Table A is referred to. In the third mode, only the Table A is referred to. In the fourth mode, only the designated one of Tables B and C is utilized according to the area in which the apparatus is used.

TABLE 3

| | Original Size | | | | | |
|---|---|---|---|---|---|---|
| Magnification | A3 | B4 | A4 | 17" × 11" | Legal | Letter |
| 0.640-0.647 | Letter | Letter | Letter | Letter | Letter | A4 |
| 0.648-0.665 | Letter | Letter | Letter | A4 | Letter | A4 |
| 0.666-0.687 | A4 | Letter | Letter | A4 | Letter | A4 |
| 0.688-0.707 | A4 | Letter | Letter | Legal | Letter | A4 |
| 0.708-0.726 | Legal | Letter | Letter | Legal | Letter | A4 |
| 0.727-0.767 | B4 | Letter | Letter | Legal | Letter | A4 |
| 0.768-0.772 | B4 | A4 | Letter | Legal | Letter | A4 |
| 0.773-0.785 | B4 | A4 | Letter | B4 | Letter | A4 |
| 0.786-0.815 | B4 | A4 | Letter | B4 | A4 | A4 |
| 0.816-0.835 | B4 | Legal | Letter | B4 | A4 | A4 |
| 0.836-0.840 | B4 | Legal | Letter | B4 | Legal | A4 |
| 0.841-0.842 | B4 | B4 | Letter | B4 | Legal | A4 |
| 0.843-0.865 | B4 | B4 | Letter | A3 | Legal | A4 |
| 0.866-0.940 | 17" × 11" | B4 | Letter | A3 | Legal | A4 |
| 0.941-0.972 | A3 | B4 | A4 | A3 | Legal | A4 |
| 0.973-1.000 | A3 | B4 | A4 | 17" × 11" | Legal | Letter |
| 1.001-1.023 | × | 17" × 11" | Legal | × | B4 | B4 |
| 1.024-1.028 | × | 17" × 11" | Legal | × | A3 | B4 |
| 1.029-1.087 | × | 17" × 11" | B4 | × | A3 | B4 |
| 1.088-1.153 | × | A3 | B4 | × | A3 | B4 |
| 1.154-1.181 | × | × | B4 | × | A3 | B4 |
| 1.182-1.190 | × | × | B4 | × | 17" × 11" | B4 |
| 1.191-1.214 | × | × | B4 | × | 17" × 11" | 17" × 11" |
| 1.215-1.223 | × | × | B4 | × | × | 17" × 11" |
| 1.224-1.294 | × | × | 17" × 11" | × | × | 17" × 11" |
| 1.295-1.330 | × | × | 17" × 11" | × | × | A3 |
| 1.331-1.375 | × | × | A3 | × | × | A3 |
| 1.376-1.414 | × | × | A3 | × | × | × |
| 1.415-1.420 | × | × | × | × | × | × |

(×: improper size)

TABLE 4

| | Original Size | | |
|---|---|---|---|
| Magnification | A3 | B4 | A4 |
| 0.640-0.707 | A4 | A4 | A4 |
| 0.708-0.815 | B4 | A4 | A4 |
| 0.816-0.865 | A4 | B4 | A4 |
| 0.866-1.000 | A3 | B4 | A4 |
| 1.001-1.153 | × | A3 | B4 |
| 1.154-1.223 | × | × | B4 |
| 1.224-1.414 | × | × | A3 |
| 1.415-1.420 | × | × | × |

(×: improper size)

TABLE 5

| | Original Size | | |
|---|---|---|---|
| Magnification | 17" × 11" | Legal | Letter |
| 0.640-0.647 | Letter | Letter | Letter |
| 0.648-0.772 | Legal | Letter | Letter |
| 0.773-0.785 | 17" × 11" | Letter | Letter |
| 0.786-1.000 | 17" × 11" | Legal | Letter |
| 1.001-1.214 | × | 17" × 11" | 17" × 11" |
| 1.215-1.294 | × | × | 17" × 11" |
| 1.295-1.420 | × | × | × |

(×: improper size)

The paper size automatic selection function includes four modes comprised of the first, second, third and fourth modes. In the first mode, either one of Tables B and C is automatically selected according to whether the detected original size is based on the metric or inch system of unit. In the second mode, when papers set in the apparatus are those on the same system of unit, either one of Tables B and C is utilized according to the area in which the apparatus is used. In contrast, when In the first and second modes, an appropriate reference table can be automatically selected from among a plurality of tables in compliance with papers set by the user. In other modes, the user can set a single desired table to always refer thereto.

Switches 90 to 93 are provided for setting any desired mode of the paper size automatic selection function. The switch 90 is a switch for setting, in the fourth mode, the table appropriate to the area in which the apparatus is used (1: Table produced for areas employing the metric system of unit, 0: Table produced for areas employing the inch system of unit). The switch 91 is a switch for selecting either one of the third and fourth modes (1: the third mode, 0: the fourth mode). The switch 92 is a switch for selecting the second mode regardless of the on/off states of the switches 90 and 91 (1: the second mode, 0: not the second mode). The switch 93 is a switch for selecting the first mode regardless of the on/off states of the switches 90 to 92 (1: the first mode, 0: not the first mode).

Accordingly, the relationship between the states of the switches 90 to 93 and the reference tables is tabulated in Table 6.

TABLE 6

| SW | | | | |
|---|---|---|---|---|
| 90 | 91 | 92 | 93 | Reference Table |
| 0 | 0 | 0 | 0 | C |
| 1 | 0 | 0 | 0 | B |
| × | 1 | 0 | 0 | A |
| 0 | × | 1 | 0 | A or C (according to the set papers) |
| 1 | × | 1 | 0 | A or B (according to the set papers) |
| × | × | × | 1 | B or C (the system of unit on which |

TABLE 6-continued

| SW | | | | |
| --- | --- | --- | --- | --- |
| 90 | 91 | 92 | 93 | Reference Table |
| | | | | originals are based) |

×: 1 or 0

(d) Construction of a Control Portion of the Copying Apparatus

Figure 4:
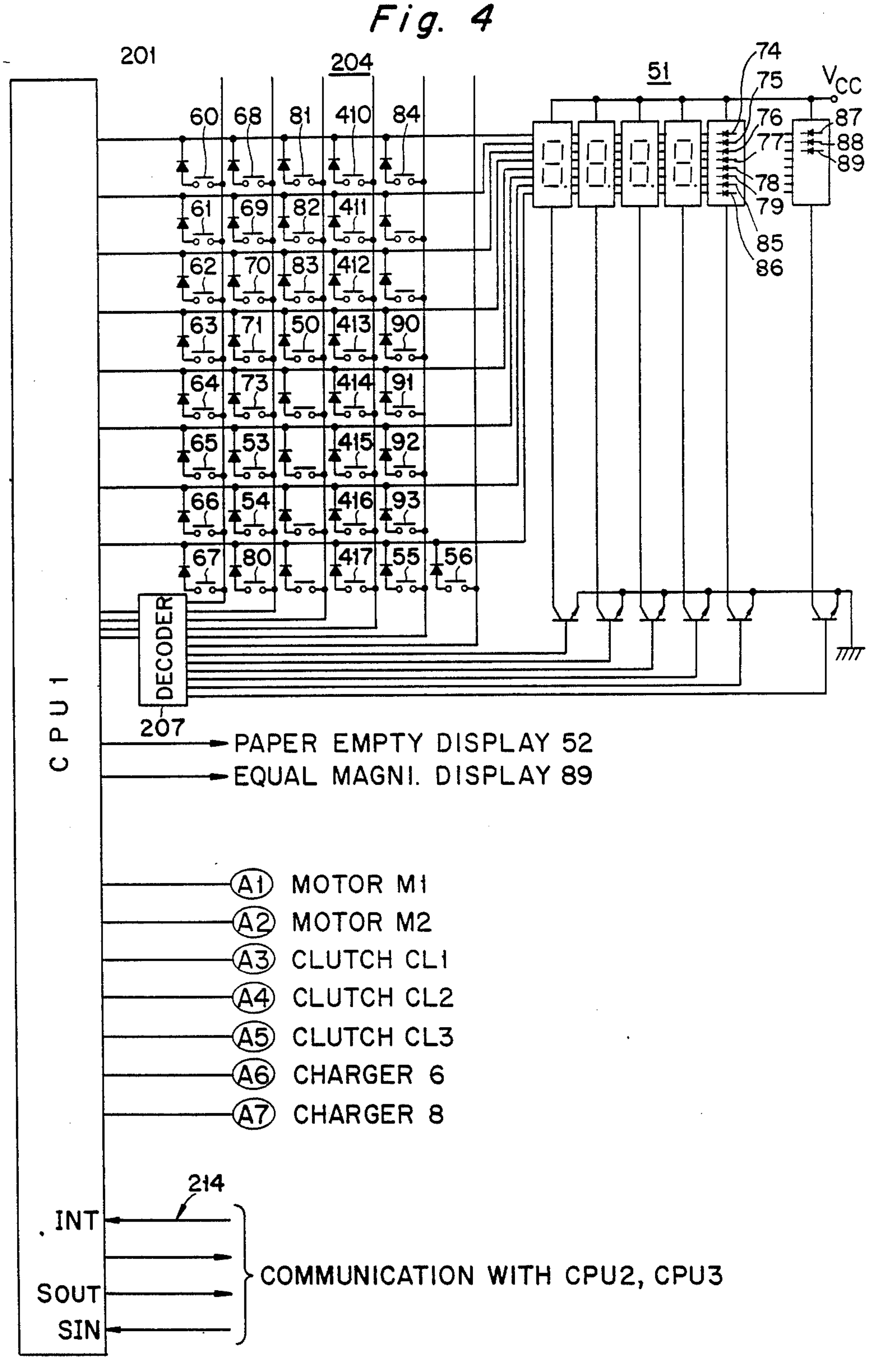
FIG. 4 is a circuit diagram indicative of input to and output from a microprocessor which controls the apparatus body.

FIG. 4 depicts a control circuit indicative of input to and output from a first CPU 201 (CPU1) which controls the copying apparatus. The first CPU 201 is provided with a plurality of input and output terminals. Various signals from a main motor M1, a development motor M2, a clutch CL1 for operating the timing roller pair, clutches CL2 and CL3 for operating upper and lower paper supply rollers, the electrostatic charger 6 and the transfer charger 8 are inputted to the input terminals of the first CPU 201, which are also connected to a switch matrix 204 for various sensors, keys 50, 53, 54, 55, 56, 60–71, 73, 80–84, 90–93, 401–404, 410–417, 420 and 421, and the like. The output terminals of the first CPU 201 are connected to a digital display device 51 capable of displaying a numerical figure comprised of up to four digits and a LED matrix of LEDs 74–79 and 85–88 so that the first CPU 201 may drives the digital display device 51 and the LED matrix through a decoder 207. The output terminals are also connected to the paper empty display 52 and the equal size magnification display 89. A plurality of buses 214 are communication lines for connecting the first CPU 201 with other CPUs such as a second CPU 202 (CPU2) and a third CPU 203 (CPU3).

Figure 5:
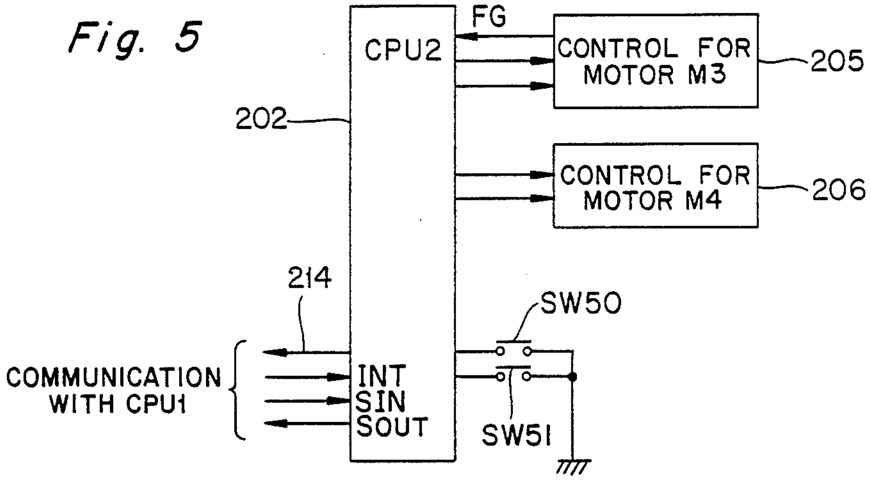
FIG. 5 is a circuit diagram indicative of input to and output from a microprocessor which controls an optical system.

FIG. 5 depicts a control circuit indicative of input to and output from the second CPU 202 which controls the optical system. The second CPU 202 is connected to a control circuit 205 for controlling an electric motor M3 for scanning use and to another control circuit 206 for controlling an electric motor M4 which drives the projector lens assembly 16 for effecting the magnification adjustment. The second CPU 202 receives signals from a switch SW50 for detecting whether or not the optical system is located in its regular position and another switch SW51 for producing a timing signal for rotation of the timing roller pair 26 at the equal size magnification. As described above, the second CPU 202 is in communication with the first CPU 201 through the buses 214.

Figure 6:
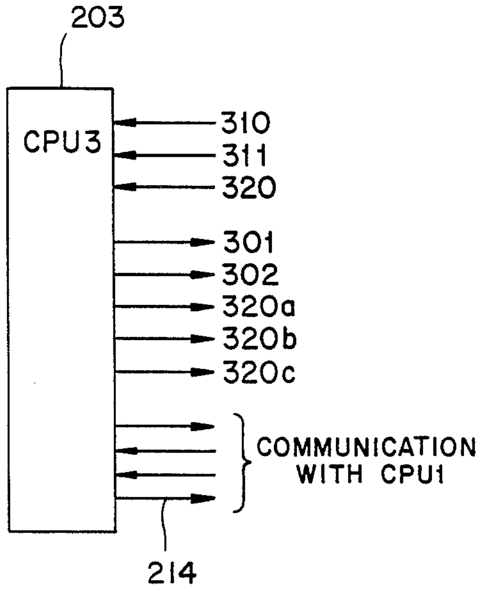
FIG. 6 is a circuit diagram indicative of input to and output from a microprocessor which controls the automatic document feeder.

FIG. 6 depicts a control circuit indicative of input to and output from the third CPU 203 which controls the DF 300. The third CPU 203 outputs signals to an electric motor 301 for driving the transport belt 305 and an electric motor 302 for supplying originals and receives signals from an original supply sensor 310 and an original detector sensor 311. The third CPU 203 is further connected to a selector key 320 and to a plurality of display elements 320*a*, 320*b* and 320*c*. This CPU 203 is in communication with the first CPU 201 through the buses 214.

(e) Operation of the Copying Apparatus

The contents of a program contained in the first CPU 201 for controlling the copying apparatus will be hereinafter discussed.

(e-1) Main Routine

Figure 7:
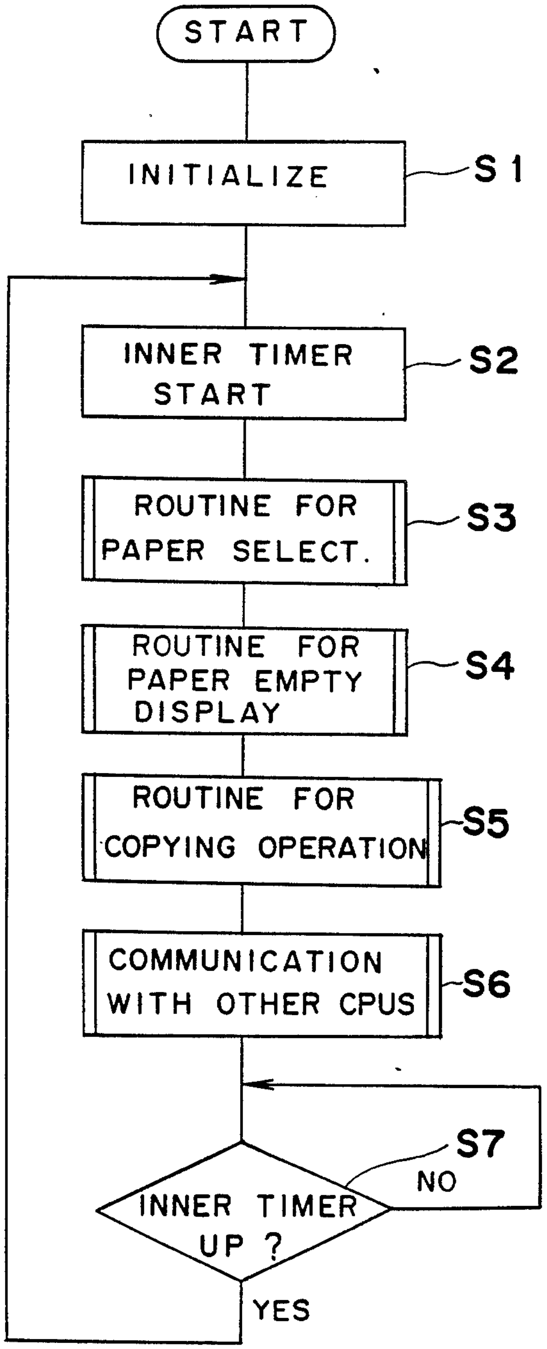
FIG. 7 is a flow chart indicative of the main routine of a program which controls the apparatus body.

FIG. 7 is a flow chart indicative of the control of the first CPU 201. In the flow chart of FIG. 7, when the program has started after resetting the first CPU 201, the initialization is performed for initializing the first CPU 201 to clear the RAM or to set various registers and for rendering the apparatus to be set in an initial mode (step s1).

An inner timer is triggered which is accommodated in the first CPU 201 and has been set during the initialization (step s2). Then, subroutines for the paper selection, for the control of the paper empty display and for the copying operation are successively executed (steps s3, s4 and s5, respectively). The first CPU 201 exchanges data communication with the second and third CPUs 202 and 203 (step s6). The original size is sent from the second CPU 202.

Upon completion of all the subroutines, when the inner timer set at the beginning is up (step s7), one routine is completed and the procedure returns to step s2. Various timers which are used in the subroutines are counted using the period of time required for one routine. (The termination of these timers is judged on the basis of the number of repeated cycles of one main routine.)

(e-2) User's Paper Selection and Paper Empty Display

Figure 8:
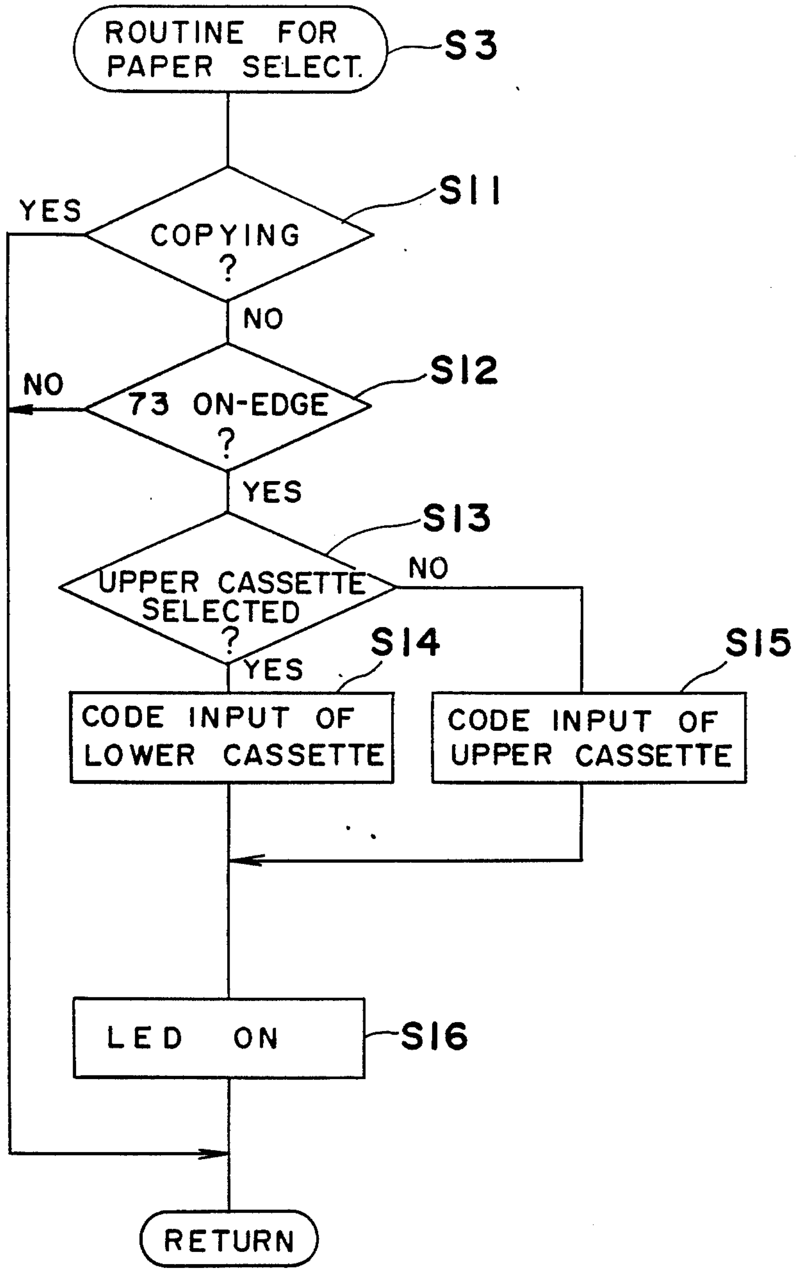
FIG. 8 is a flow chart indicative of a subroutine for paper selection.

FIG. 8 is a flow chart indicative of the subroutine of step s3 for the paper selection.

When no copying operation is being executed (step s11) and the paper selector switch 73 is turned on (step s12), an on-edge of this switch acts to select the lower paper supply cassette 21 (step s14) when the upper paper supply cassette 20 is set (step s13) or to select the upper paper supply cassette 20 (step s15) when the lower paper supply cassette 21 is set (step s14) so that the size code of set papers may be inputted. The on-edge implies a state in which it is judged for the first time in a routine that a certain switch or sensor which was kept off has been turned on. As a result, one of the LEDs 74–79 corresponding to the size of set papers is turned on (step s16).

Figure 9A:
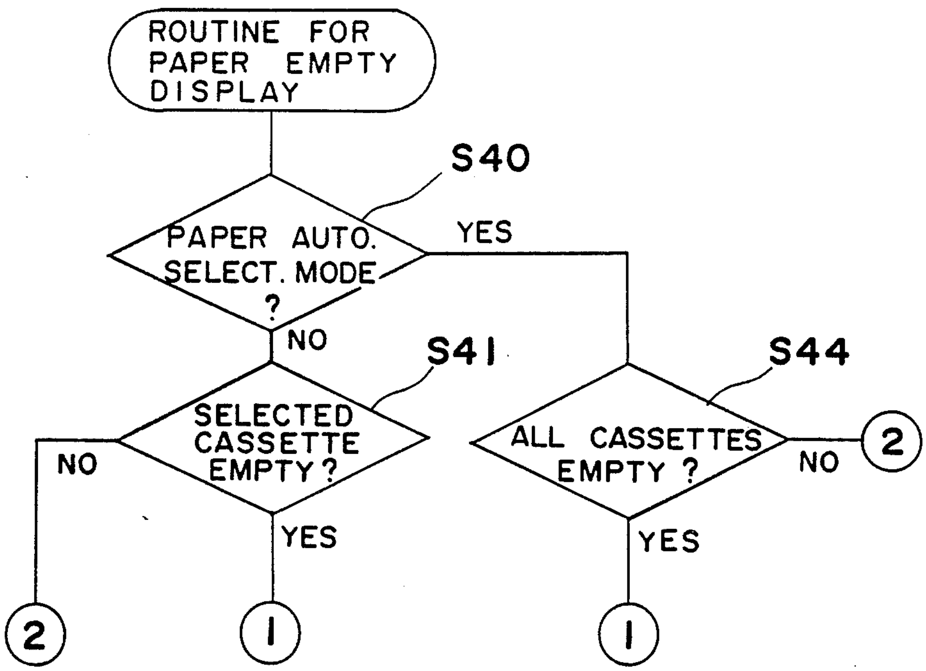
FIG. 9, comprised of FIGS. 9*a* and 9*b*, is a flow chart indicative of a subroutine for control of the paper empty display.
Figure 9B:
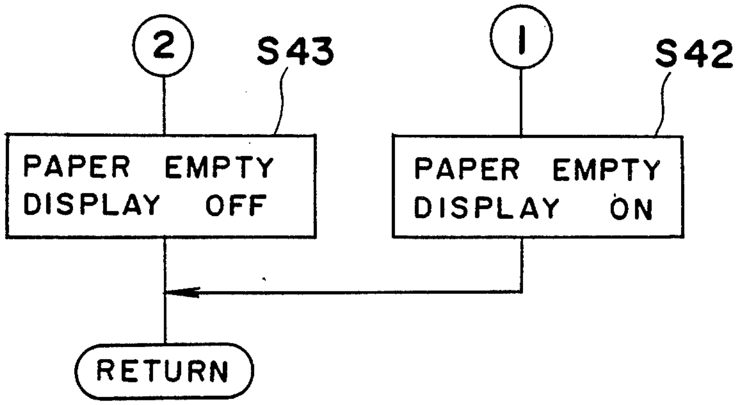

FIG. 9, comprised of FIGS. 90*a* and 9*b*, is a flow chart indicative of the subroutine of step s4 for the control of the paper empty display. It is judged (step s40) whether or not the paper size automatic selection mode is set. When the paper size automatic selection mode is not set and the selected cassette 20 or 21 is empty (step s41), the paper empty display is turned on (step s42). In contrast, when the selected cassette 20 or 21 is not empty, the paper empty display is turned off.

When the paper size automatic selection mode is set (step s40), it is judged (step s44) whether or not all the cassettes provided in the copying apparatus are empty. If empty, the paper empty display is turned on (step s42). Otherwise, the paper empty display is turned off (step s43).

(e-3) Copying Operation

Figure 10A:
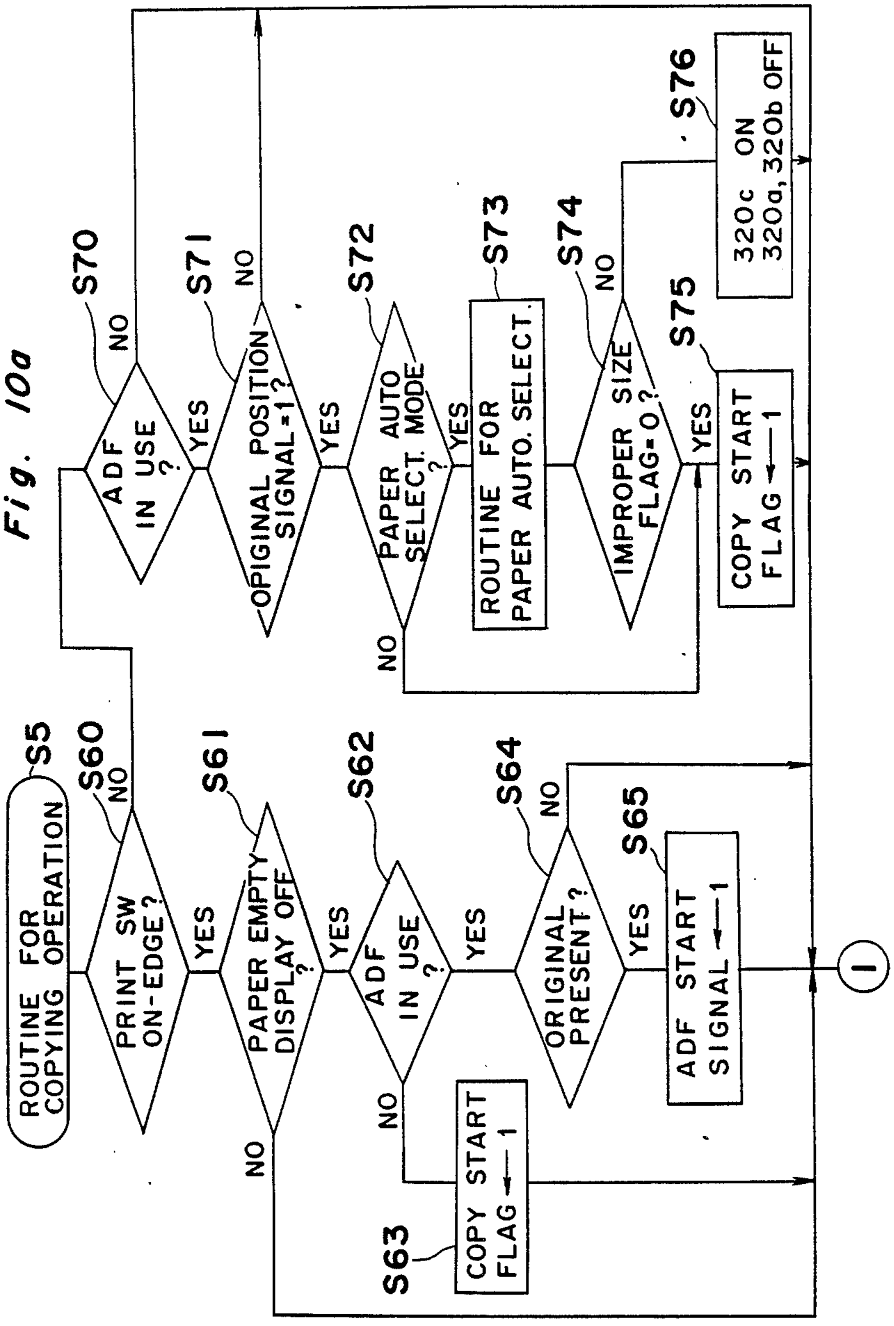
FIG. 10, comprised of FIGS. 10*a*, 10*b* and 10*c*, is a flow chart indicative of a subroutine for the copying operation according to the present invention.
Figure 10B:
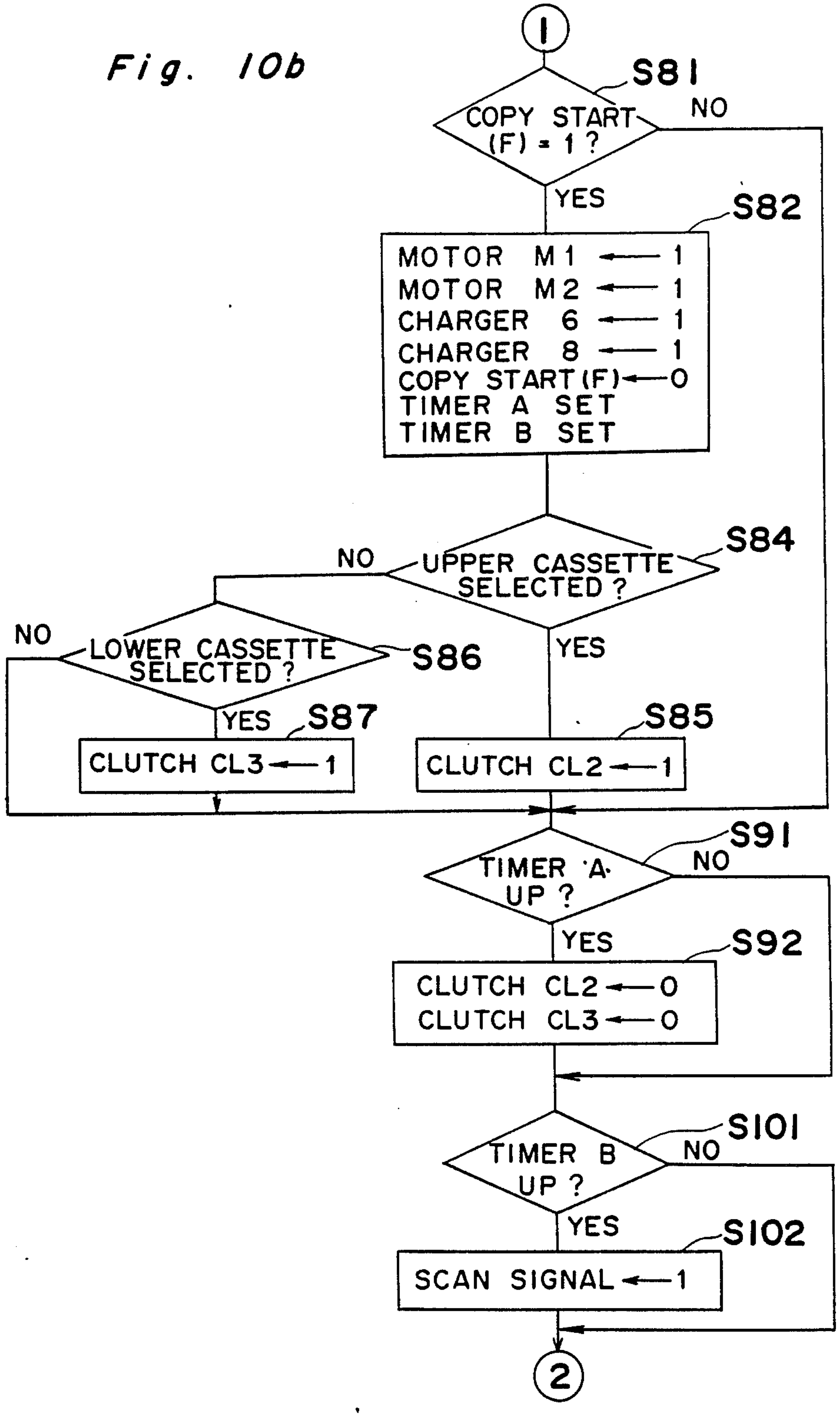
Figure 10C:
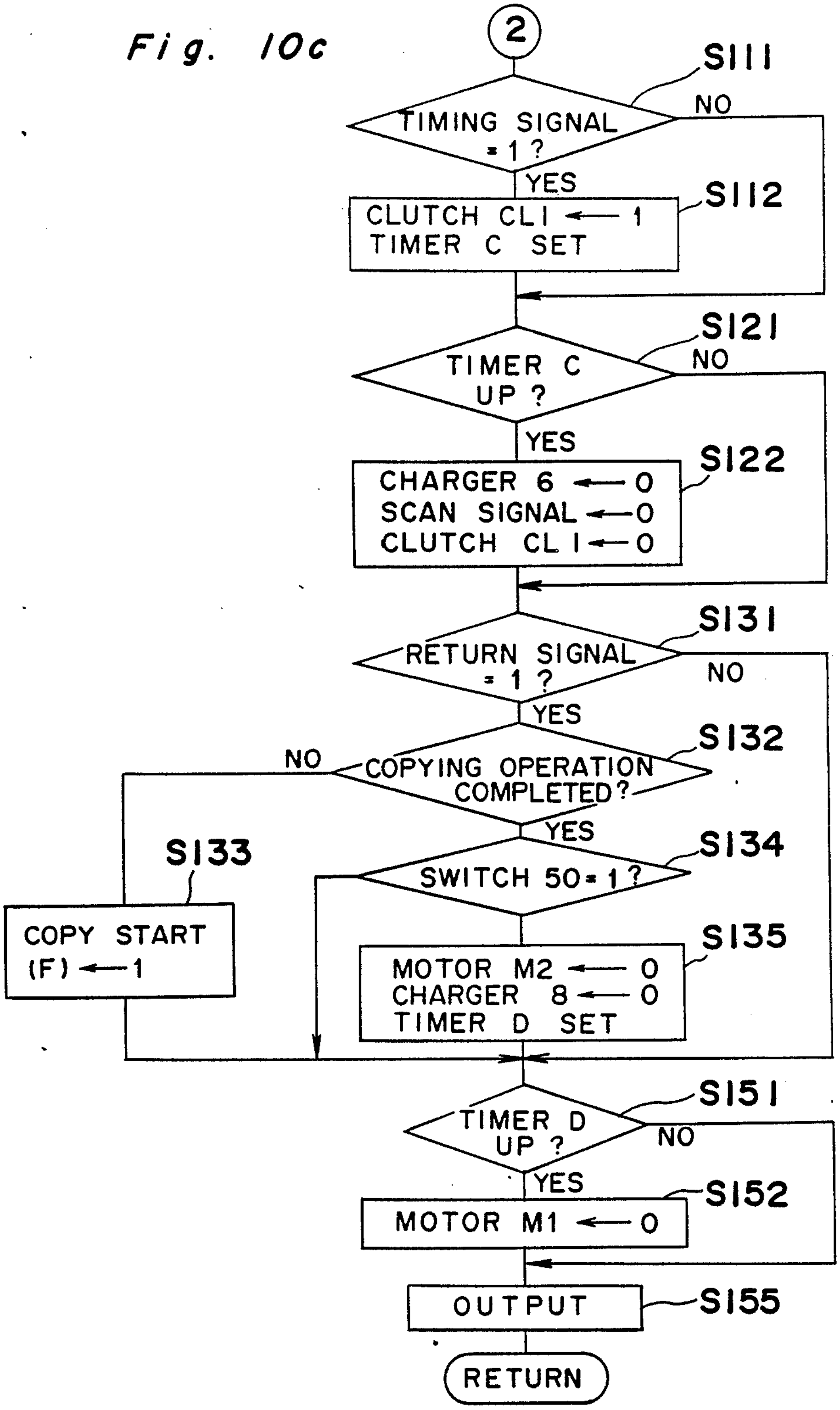

FIG. 10, comprised of FIGS. 10*a*, 10*b* and 10*c*, is a flow chart indicative of the subroutine of step s5 for the copying operation.

An on-edge (step s60) of the print switch 50 renders a copy start flat to be "1" (step s63) when the paper empty display 52 is off (step s61) and the ADF is not in use (step s62). When the ADF is in use (step s62) and the original tray 304 is charged with original documents (step s64), and ADF start signal is rendered to be "1" (step s65) with respect to the DF 300. When the paper empty display 52 is on (step s61), the procedure starts the copying operation (step s81).

When the on-edge of the print switch 50 is not detected (step s60) and the ADF is in use (step 70), it is judged (step s71) whether or not a signal indicating that an original to be copied is at its proper position is rendered to be "1". This signal is sent from the DF 300. When this signal is rendered to be "1" (step s71, the subroutine for the paper size automatic selection, which will be later described with reference to FIG. 11, is called (step s73) in the case where the mode of the ADF is the paper size automatic selection mode (step s72). As a result, if an improper size indicating flag is "0" (step s74), a copy start flag is rendered to be "1" (step s75). If the improper size indicating flat is "1", the LED 320*c* is turned on and the LEDs 320*a* and 320*b* are turned off. THe mode of the ADF is then automatically switched to a manual mode (step s76).

The following copying operation is the same as the conventional. When the copy start flag is rendered to be "1" (step s81), the main motor M1 and the development motor M2 are energized whereas the electrostatic charger 6, the transfer charger 8 etc. are deenergized. At the same time, the copy start flag is rendered to be "0" and timers A and B are set (step s82). When the upper paper supply cassette 20 is selected (step s84), the clutch CL2 for the upper paper supply roller 22 is energized (step s85). When the lower paper supply cassette 21 is selected (step s86), the clutch CL3 for the lower paper supply roller 23 is energized (step s87).

When it is judged (step s91) that the timer A is up, the clutches CL2 and CL3 for the upper and lower paper supply rollers 22 and 23 are denergized.

When it is judged (step 101) that the timer B is up, a scan signal is rendered to be on (step s102).

When a timing signal is rendered to be "1" (step s111), the clutch CL1 for the timing roller pair 26 is energized and a timer C is set (step s112).

At the timing when the timer C is up (step s121), the electrostatic charger 6 and the clutch CL1 for the timing roller pair 26 are deenergized and the scan signal is turned off (step s122).

When a return signal of the optical system is "1", that is, when the optical system starts to return (step s131), it is judged (step s132) whether or not the copying operation has been completed by the set number of copies. If not completed, the copy start flag is rendered to be "1" (step s133). Upon completion of the copying operation by the set number of copies, the scanner returns to its home position. In this event, when the scanner actuates the position detector switch SW50 (step s134), the development motor M2 and the transfer charger 8 are brought to a stop and a timer D is set (step s135).

When the timer D is up (step s151), the main motor M1 is brought to a stop (step s152) and the results of the processing performed until now are outputted (step s155).

(e-4) Paper Size Automatic Selection (including Table Automatic Selection)

Figure 11A:
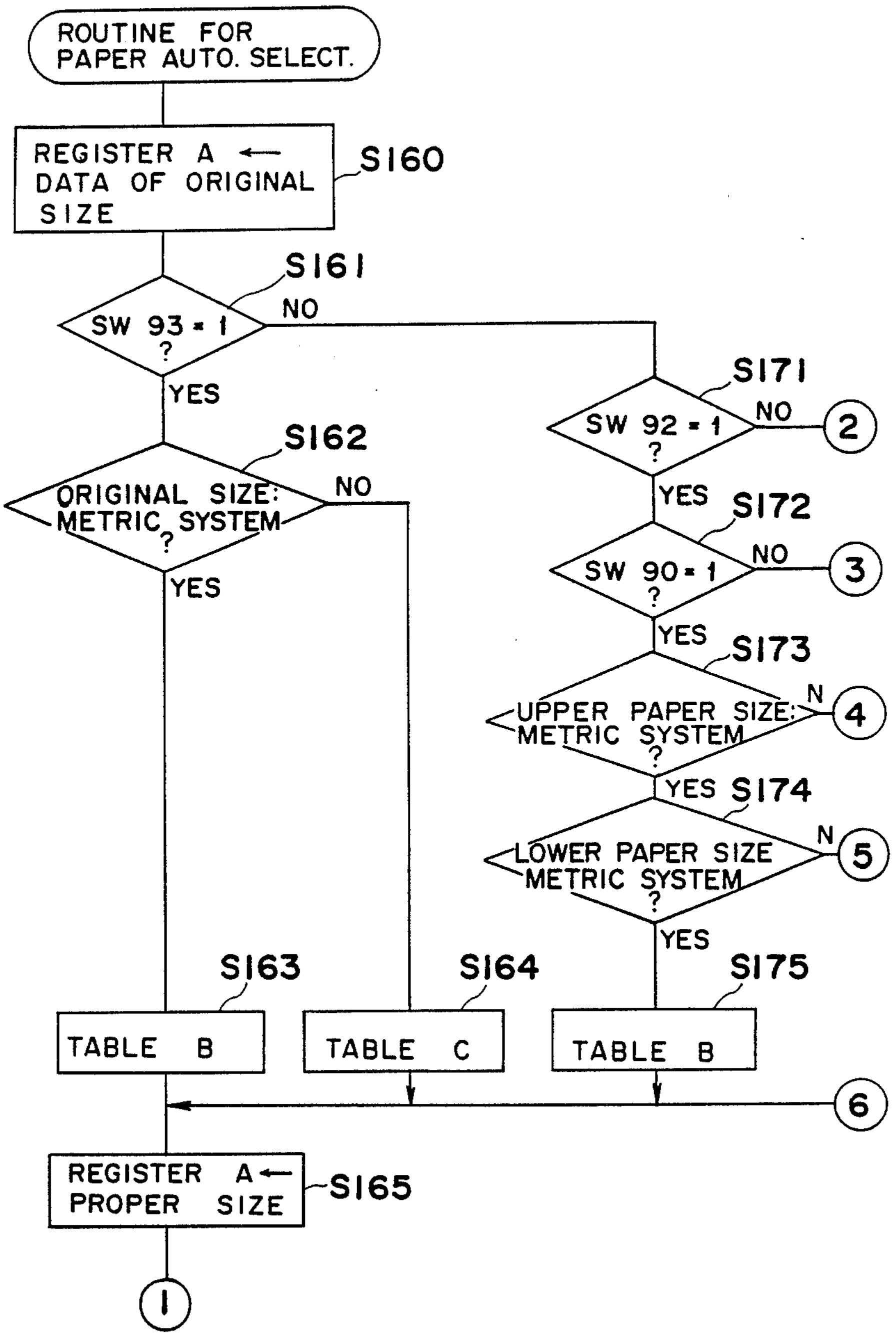
FIG. 11, comprised of FIGS. 11*a*, 11*b* and 11*c*, is a flow chart indicative of a subroutine for paper size automatic selection.
Figure 11B:
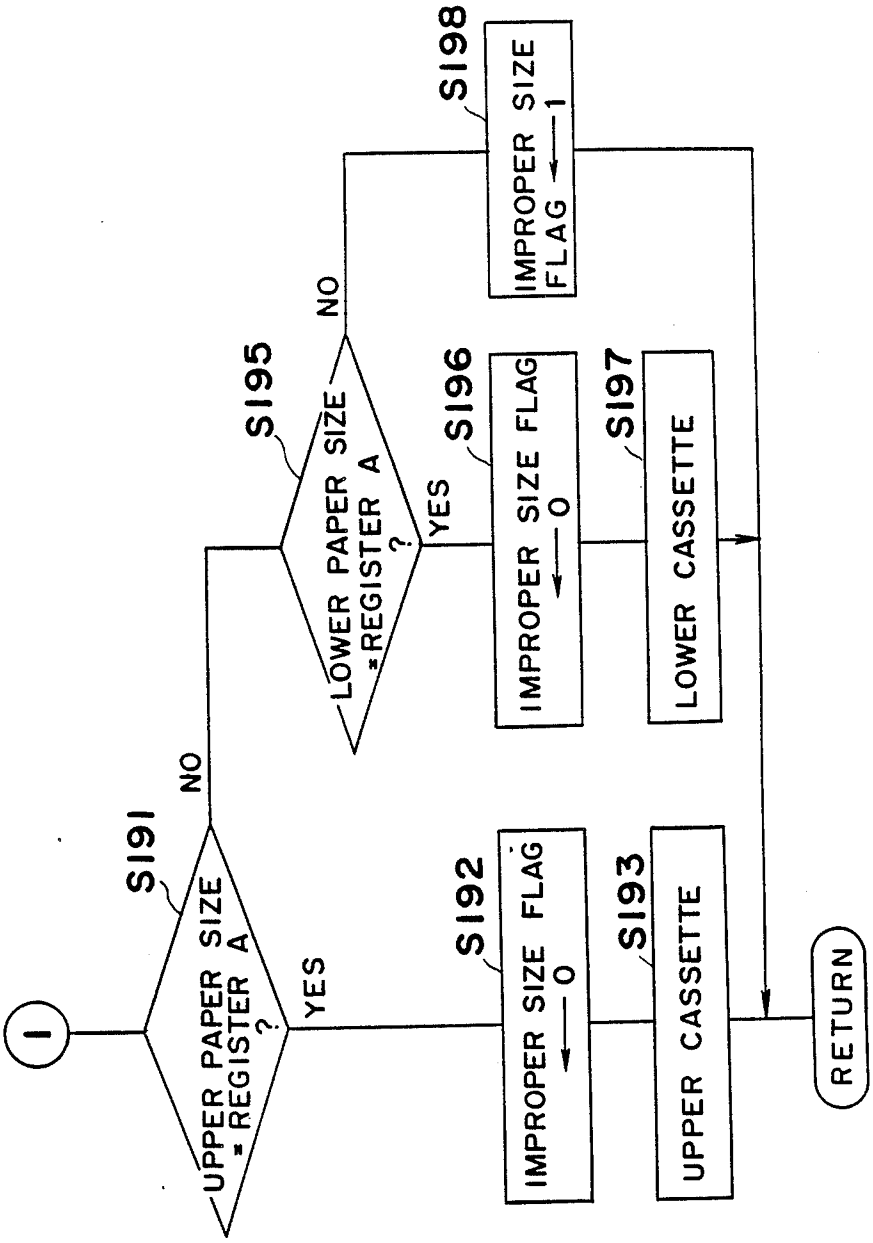
Figure 11C:
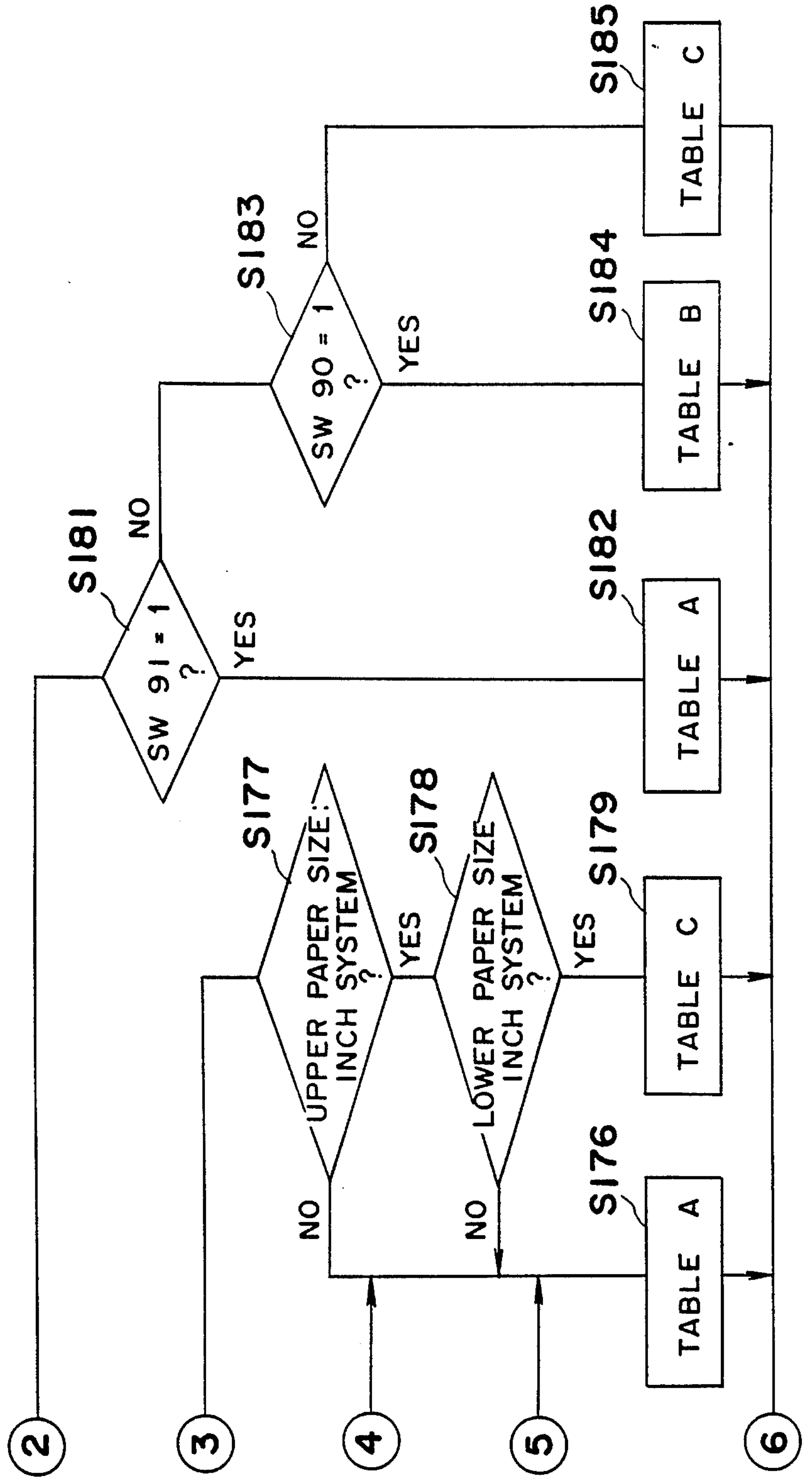

FIG. 11, comprised of FIGS. 11*a*, 11*b* and 11*c*, is a flow chart indicative of the subroutine for the paper size automatic selection which is a process performed at step s73 in the flow chart of FIG. 10*a*.

Data of the original size are detected by the DF 300 and sent from the third CPU 203 which controls the DF 300 (step s6). These data are temporarily stored in a register A (step s160).

Then, the desired paper search table is selected on the basis of the states of the switches 90–93 to determine the appropriate paper size.

It is initially judged (step s161) whether or not the first mode is et. When the signal of the switch 93 is "1" which implies the first mode is set, it is judged (step s162) whether or not the original size is based on the metric system of unit. If the judgment at step s162 is YES, Table B is referred to (step s163) whereas if the judgment at step s162 is NO, Table C is referred to (step s164).

Subsequently, information indicative of the proper paper size or of no presence thereof is inputted into the register A (step s165).

If it is judged (step s161) that the first mode is not set, it is judged (step s171) on the basis of the signal of the switch 92 whether or not the second mode is set. When this signal is "1" which implies that the second mode is set, the state of the switch 90 is judged (step s172) which indicates an area to which the copying apparatus is shipped. If the copying apparatus is to be shipped to the area employing the metric system of unit i.e., the signal of the switch 90 is "1", Table B is referred to (step s175) in the case where both the upper and lower paper supply cassettes 20 and 21 are charged with papers based on the metric system of unit (the judgment is YES at steps s173 and s174). If at least one of the paper supply cassettes 20 and 21 is charged with papers based on the inch system of unit (the judgment is NO at step s173 or s174), the worldwide Table A is referred to (step s176). When the copying apparatus is shipped to an area employing the inch system of unit (the signal of the switch 90 is "0") and both the upper and lower paper supply cassettes 20 and 21 are charged with papers based on the inch system of unit (the judgment is YES at steps s177 and s178), Table C is referred to (step s179). When at least one paper supply cassette is charged with papers based on the metric system (the judgment is NO at step s177 or s178), the worldwide Table A is referred to (step s176).

When neither the first mode nor the second mode is set, it is judged (step s181) whether or not the signal of the switch 91 is "1" which implies that the third mode is set. When the third mode is set, the worldwide Table A is referred to (step s182). If the judgment at step s181 is NO which implies that the fourth mode is set, Table B for the metric system of unit or Table C for the inch system of unit is referred to (step s184 or s185) according to whether the signal of the switch 90 is "1" or "0" (step s183).

At the aforementioned steps s163, s164, s175, s176, s179, s182, s184 and s185 for selecting the desired reference table, the proper paper size is determined on the basis of the data of the original size and those of the magnification ratio with reference to Table A, B or C. Under certain circumstance, there exists no proper paper size. The register A memorizes data of the proper paper size or of no presence thereof (step s165).

Subsequently, papers accommodated in each paper supply cassette are examined.

First, the data stored in the register A is compared with the size of papers accommodated in the upper paper supply cassette 20 (step s191). When the former is the same as the latter (the judgment at step s191 is YES), the improper size flag is rendered to be "0" (step s192) and the upper paper supply cassette 20 is selected (step s193). When the data stored in the register A differ from the size of papers accommodated in the upper paper supply cassette 20, the former is then compared with the size of papers accommdated in the lower paper supply cassette 21 (step s195). When these are the same (the judgment at step s195 is YES), the improper size flag is rendered to be "0" (step s196) and the lower paper supply cassette 21 is selected (step s197). If the data of the register A differ from both the sizes of papers accommodated in the upper and lower paper supply cassettes 20 and 21, the improper size flag is rendered to be "1" (step s198).

(f) Operation of ADF

Figure 12A:
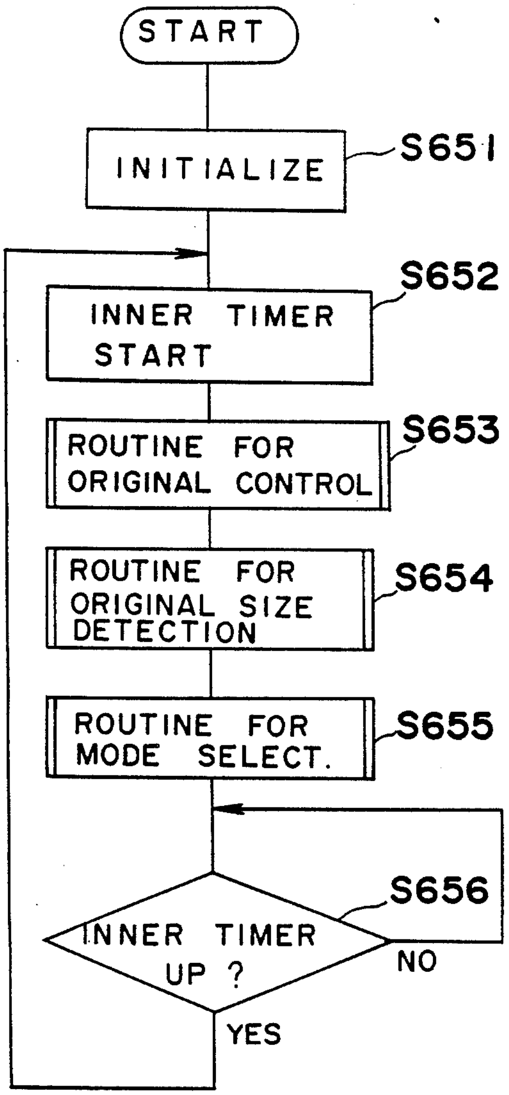
FIG. 12*a*is a flow chart indicative of the main routine of a program provided in the microprocessor which controls the automatic document feeder.
Figure 12B:
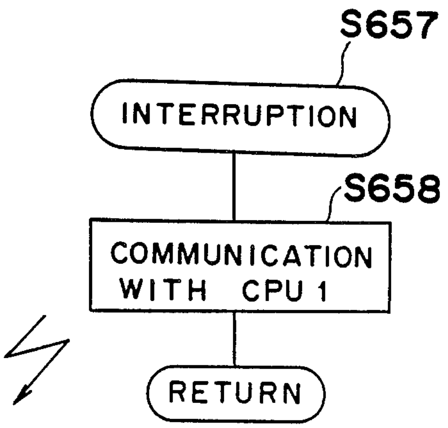
FIG. 12*b* a flow chart indicative of a subroutine for interruption.

FIGS. 12a and 12b are flow charts of the third CPU 203 which controls the DF 300.

When the third CPU 203 is reset to starts its program, the initialization is performed at step s651 for initializing the third CPU 203 to clear the RAM or to set various registers and for rendering the apparatus to be set in an initial mode.

An inner timer is triggered which is accommodated in the third CPU 203 and has been set during the initialization (step s652).

Then, subroutines for the original control, the original size detection and the mode selection are successively executed at steps s653, s654 and s655, respectively. Upon completion of all the subroutines, when the inner timer set at the beginning is up, one routine is completed (step s656). Various timers which are used in the subroutines are counted using the period of time required for one routine. (The termination of these timers is judged on the basis of the number of repeated cycles of one main routine.)

As shown in the flow chart of FIG. 12b, data communication (step s658) of the third CPU 203 with the first CPU 201 is executed in an interruption mode according to the request of interruption (step s657) from the first CPU 201 regardless of the main routine.

Figure 13:
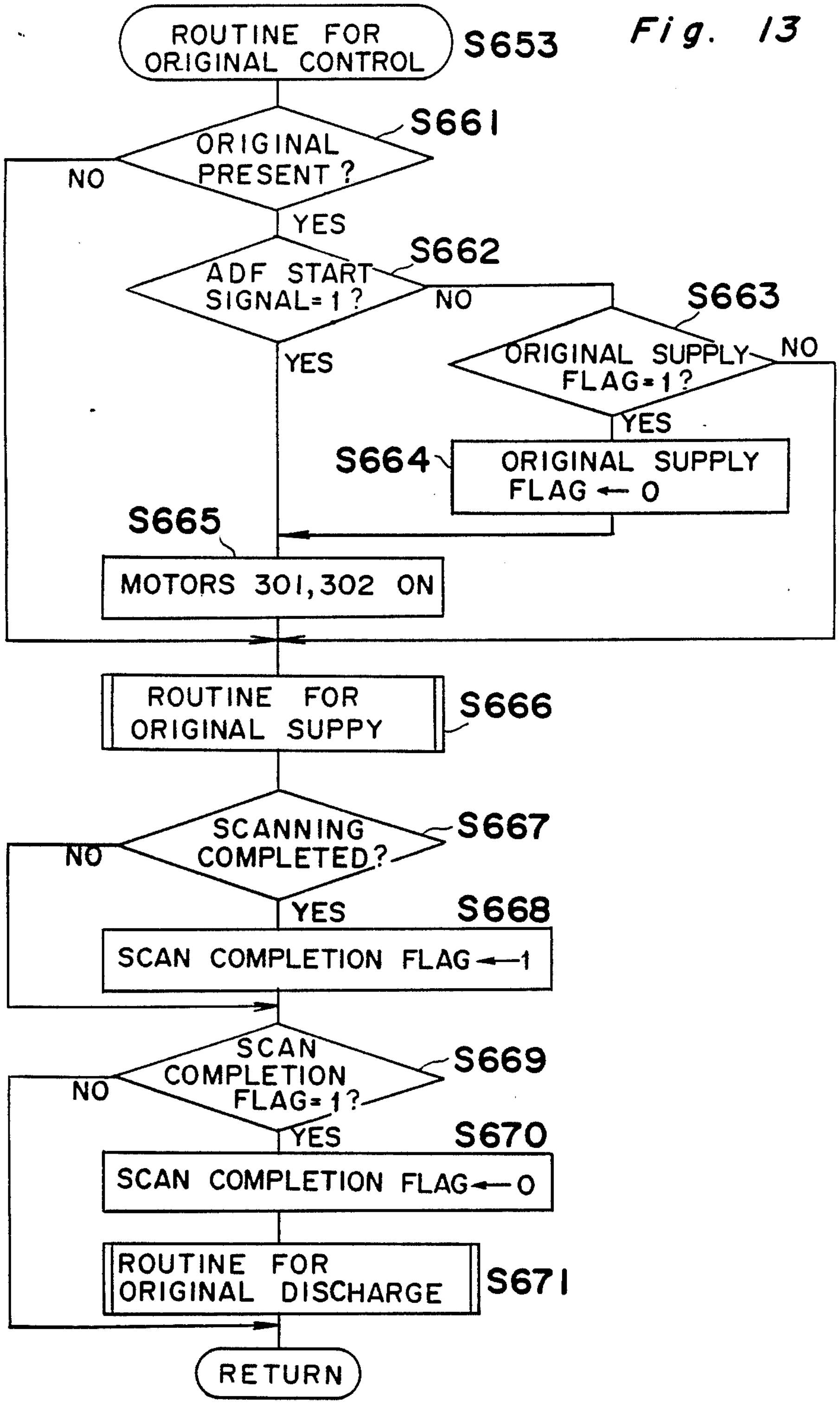
FIG. 13 is a flow chart indicative of a subroutine for control of original documents.

FIG. 13 depicts the subroutine for the original control (step s653).

When the original detector sensor 311 is on which implies that the original tray 304 accommodates at least one original document (step s661), it is judged (step s662) whether or not the ADF start signal sent from the first CPU 201 is rendered to be "1". If the judgment at step s662 is YES, the procedure proceeds to step s665. Even if the judgment at step s662 is NO, when the original supply flag is rendered to be "1" (step s663), the procedure also proceeds to step s665 after the original supply flag has been rendered to be "0" (step s664). Then, the motor 301 for driving the transport belt 305 and the motor 302 for supplying originals are turned on (step s665).

At the subsequent step s666, the subroutine for the original supply processing is executed which will be later described with reference to FIG. 14. Upon completion of scanning by the set number of copies (step s667), the scan completion flag is rendered to be "1" (step s668).

When the scan completion flag is "1" (step s669), this flag is rendered to be "0" (step s670) so that the subroutine for the original discharge processing may be executed (step s671). This subroutine will be later discussed with reference to FIG. 15.

Figure 14:
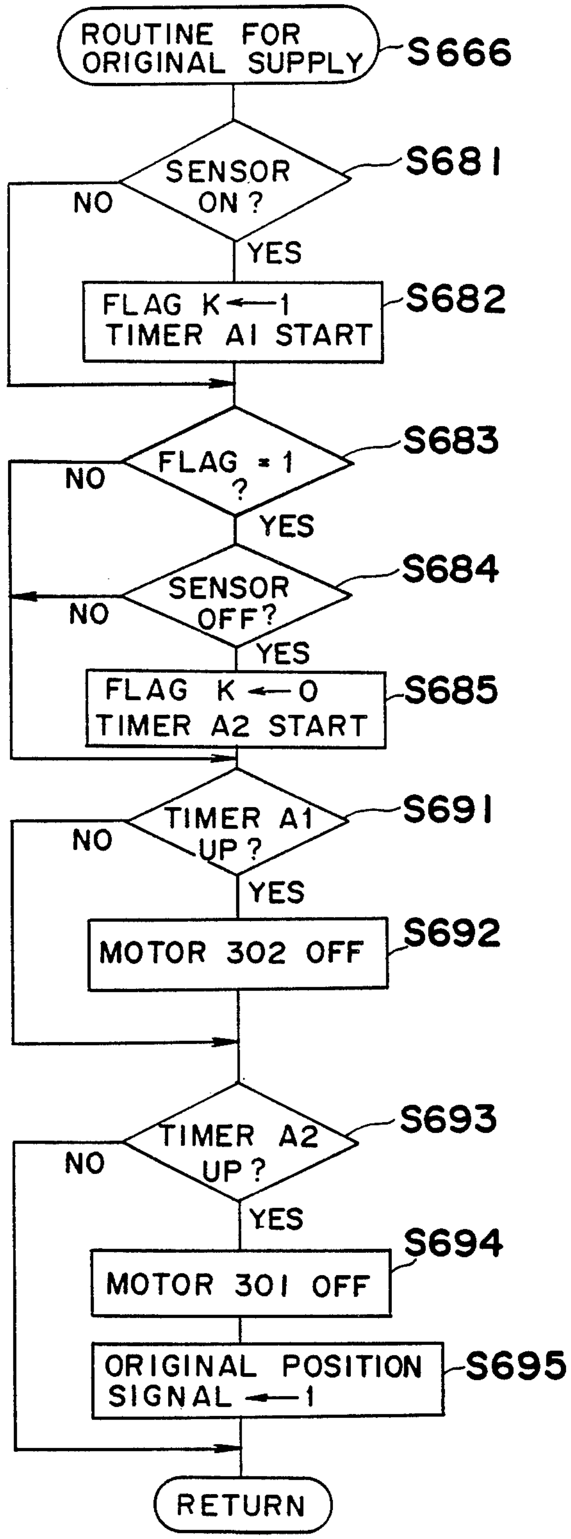
FIG. 14 is a flow chart indicative of a subroutine for original supply processing.

FIG. 14 is a flow chart indicative of the subroutine (step s666) for the original supply processing.

Upon supply of an original, when the original supply sensor 310 is turned on (step s681), a flag K is rendered to be "1" and a timer A1 is starter (step s682). This timer A1 is utilized at the time of stopping the motor 302 in order to prevent the next original from being supplied after the previous original has been supplied. This timer has a value corresponding to a period of time during which the original reaches a location where the transport belt 305 can drive the original.

When the flag K is "1" (step s683) and when the original supply sensor 310 is turned off i.e., the trailing end of the original is detected (step s684), the flag K is rendered to be "0" and a timer A2 is started (step s685). The timer A2 has a value corresponding to a period of time during which the trailing end of the original reaches a location of the original support glass 11 on which the leading end of the original is lined.

Upon completion of the timer A1 (step s691), the motor 302 is brought to a stop (step s692). Upon completion of the timer A2 (step s693), the motor 301 is brought to a stop (step s694) and a signal indicative of the properly positioned original is sent to the first CPU 201 (step s695).

Figure 15:
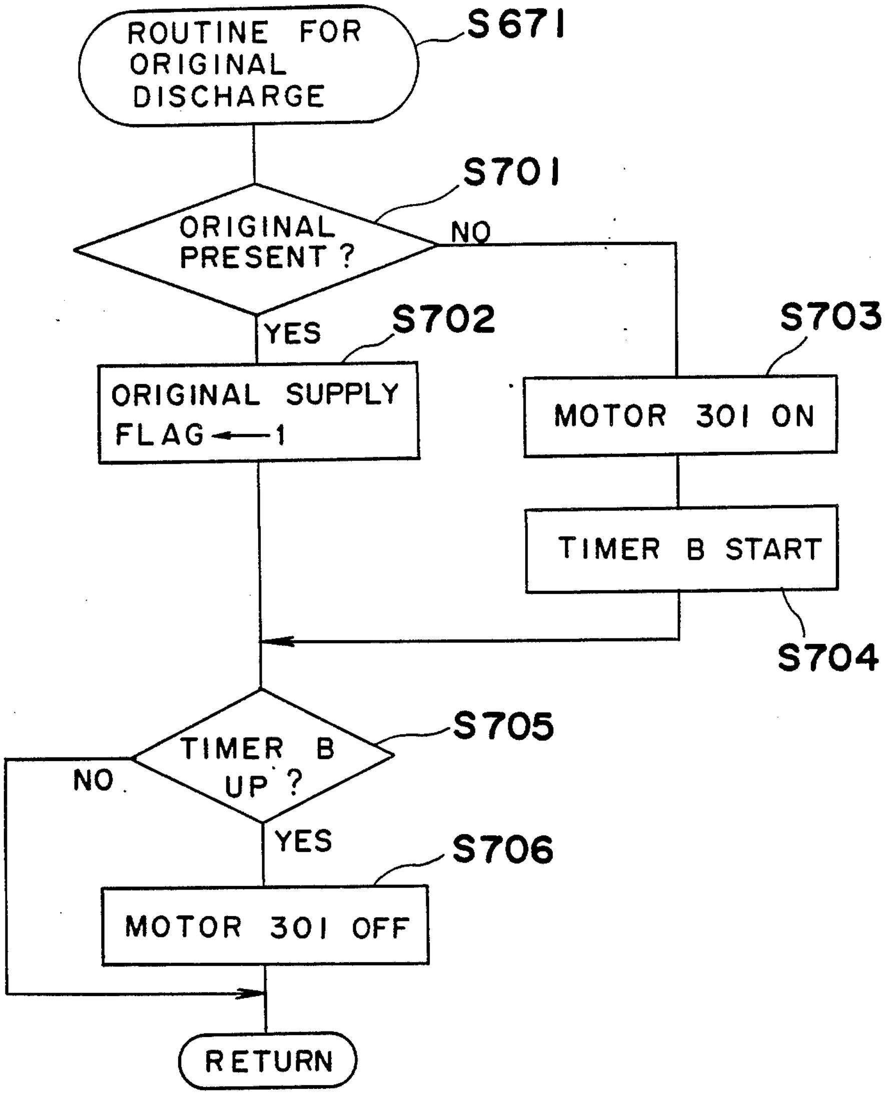
FIG. 15 is a flow chart indicative of a subroutine for original discharge processing.

FIG. 15 is a flow chart indicative of the subroutine (step s671) for the original discharge processing.

When the sensor 311 judges that another original is still accommodated in the original tray 304 (step s701), the original supply flag is rendered to be "1" (step s702). When the original tray 304 accommodates no original, the motor 301 is rotated in the positive direction (step s703) and a timer B is started (step s704). In the timer B is set a period of time within which any original placed on the original support glass 11 can be discharged.

Upon completion of the timer B (step s705), the motor 301 is turned off (step s706).

Figure 16:
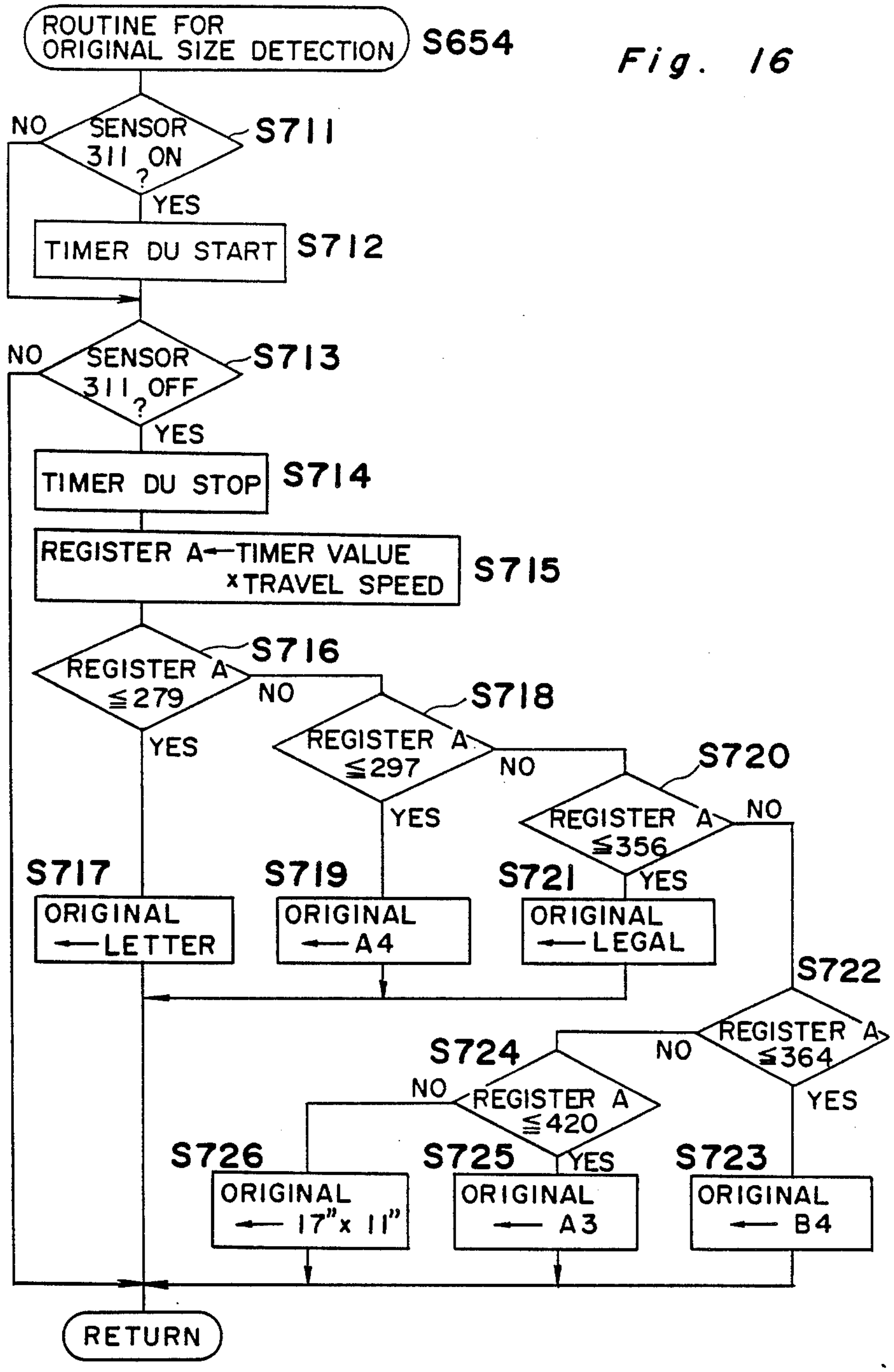
FIG. 16 is a flow chart indicative of a subroutine for detection of the original size.

FIG. 16 is a flow chart indicative of the subroutine (step s654) for the original size detection.

A timer DU is started (step s712) by an on-edge of the original detector sensor 311 (step s711) and is brought to a stop (step s714) by an off-edge thereof which takes place when the trailing end of the original passes this sensor (step s713). In this event, the register A memorizes the length of the original which is obtained by multiplying the value of the timer DU by the original traveling speed (step s715). When the value stored in the register A is less than 279 mm (step s716), the original size is judged to be the letter one (step s717). When this value is less than 297 mm (step s718), the original size is judged to be A4 (step s719). When this value is less than 356 mm (step s720), the original size is judged to be the legal one (step s721). When this value is less than 364 mm (step s722), the original size is judged to be B4 (step s723). When this value is less than 420 mm (step s724), the original size is judged to be A3 (step s715). Further, when this value exceeds 420 mm, the original size is judged to be 17"×11" size (step s726).

In order to judge the original size more correctly, an additional sensor for detecting the width of originals is required at a location adjacent to the sensor 310. Originals having the same length and different widths (for example, a horizontally positioned A4-sized original and a vertically positioned A5-sized one) can be distinguished from each other by making use of this additional sensor.

Figure 17:
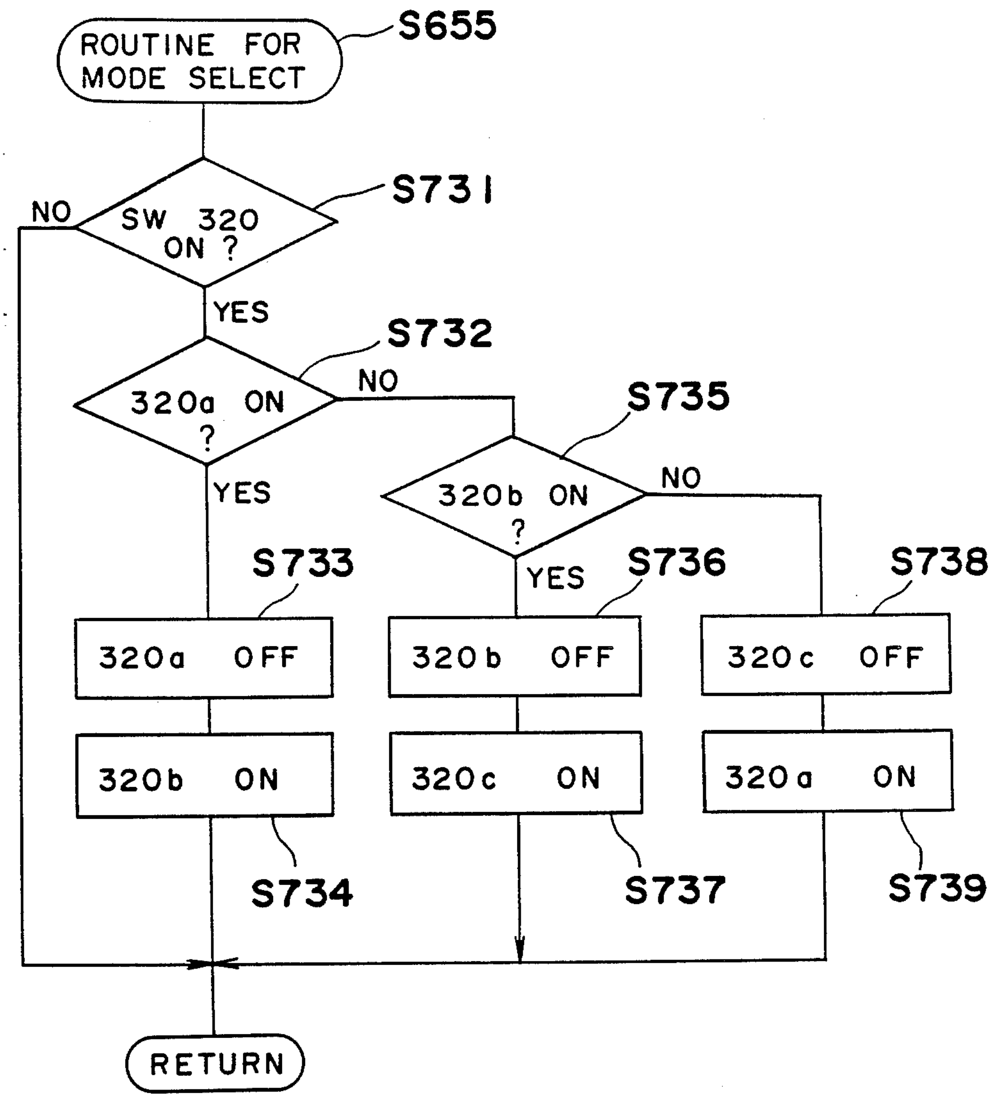
FIG. 17 is a flow chart indicative of a subroutine for mode selection.

FIG. 17 is a flow chart indicative of the subroutine (step s655) for the mode selection.

Whenever the mode selector switch 320 is switched on (step s731), one of the selection modes is switched to another. More specifically, if the LED 320a is kept on which implies that the paper size automatic selection mode is set (step s732), the magnification automatic selection mode is newly selected (steps s733 and s734). If the LED 320b is kept on which implies that the magnification automatic selection mode is set (step s735), the manual mode is newly selected (steps s736 and s737). If the LED 320*c* is kept on which implies that the manual mode is set, the paper size automatic selection mode is newly selected (setps s738 and s739).

As described above, in the paper size automatic selection function, the user can select his desired mode from among the worldwide mode and other modes appropriate to the destinations to which the copying apparatuses are shipped. Because of this, the copying apparatus according to the present invention can be used in various localities employing different systems of unit. In addition, various kinds of originals or papers can be used in this copying apparatus.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A copying apparatus having a paper size automatic selection function for automatically selecting papers of any desired size in a plurality of available sizes, said copying apparatus comprising:

a photosensitive member;

an image forming means for forming an image of an original document on said photosensitive member to transfer the image onto a copy paper;

a plurality of paper supply means each accommodating a plurality of copy papers for supplying the copy papers one at a time to said image forming means;

an original size detecting means for detecting the size of the original document to be copied;

a copy paper size detecting means for detecting the size of the copy papers accommodated in said paper supply means;

a magnification selecting means for selecting a desired magnification ratio;

a first reference table for indicating a relationship among sizes of original documents based on an inch system of unit, magnification ratios and sizes of copy papers based on the inch system of unit;

a second reference table for indicating a relationship among sizes of original documents based on a metric system of unit, magnification ratios and sizes of copy papers based on the metric system of unit;

a table selecting means for selecting either one of said reference tables; and a control means for determining the size of copy papers appropriate to the detected size of the original document and the selected magnification ratio on the basis of the selected reference table to thereby select the paper supply means accommodating the copy papers of the desired size.

2. The copying apparatus according to claim 1, wherein said table selecting means comprises a manual switch to be operated for selecting a desired table.

3. The copying apparatus according to claim 1, wherein said table selecting means selects a desired table in accordance with the detected size of the original document.

4. The copying apparatus according to claim 3, wherein said table selecting means selects said first reference table when the detected size of the original document is based on the inch system of unit and selects said second reference table when the detected size of the original document is based on the metric system of unit.

5. The copying apparatus according to claim 1, wherein said table selecting means selects a desired table in accordance with the detected size of the copy paper.

6. The copying apparatus according to claim 5, wherein said table selecting means selects said first reference table when all the sizes of the copy papers accommodated in said paper supply means are based on the inch system of unit.

7. The copying apparatus according to claim 5, wherein said table selecting means selects said second reference table when all the sizes of the copy papers accommodated in said paper supply means are based on the metric system of unit.

8. The copying apparatus according to claim 1, further comprising a third reference table for indicating a relationship among sizes of original documents based on the inch and metric systems of unit, the magnification ratios and sizes of the copy papers based on the inch and metric systems of unit.

9. The copying apparatus according to claim 8, wherein said table selecting means selects said third reference table when both of the copy papers based on the inch system of unit and those based on the metric system of unit are accommodated in said paper supply means.

10. A copying apparatus having a paper size automatic selection function for automatically selecting papers of any desired size in a plurality of available sizes, said copying apparatus comprising:

a photosensitive member;

an image forming means for forming an image of an original document on said photosensitive member to transfer the image onto a copy paper;

a plurality of paper supply means each accommodating a plurality of copy papers for supplying the copy papers one at a time to said image forming means;

an original size detecting means for detecting the size of the original document to be copied;

a copy paper size detecting means for detecting the size of the copy papers accommodated in said paper supply means;

a magnification selecting means for selecting a desired magnification ratio;

a plurality of reference tables for indicating respective relationships among sizes of original documents, magnification ratios and sizes of copy papers;

a table selecting means for selecting a desired reference table in accordance with the detected size of the original document; and a control means for determining the size of copy papers appropriate to the detected size of the original document and the selected magnification ratio on the basis of the selected reference table to thereby select the paper supply means accommodating the copy papers of the desired size.

11. A copying apparatus having a paper size automatic selection function for automatically selecting papers of any desired size in a plurality of available sizes, said copying apparatus comprising:

a photosensitive member;

an image forming means for forming an image of an original document on said photosensitive member to transfer the image onto a copy paper;

a plurality of paper supply means each accommodating a plurality of copy papers for supplying the copy papers one at a time to said image forming means;

an original size detecting means for detecting the size of the original document to be copied;

a copy paper size detecting means for detecting the size of the copy papers accommodated in said paper supply means;

a magnification selecting means for selecting a desired magnification ratio;

a plurality of reference tables for indicating respective relationships among sizes of original documents, magnification ratios and sizes of copy papers;

a table selecting means for selecting a desired reference table in accordance with the detected size of the copy paper; and a control means for determining the size of copy papers appropriate to the detected size of the original document and the selected magnification ratio on the basis of the selected reference table to thereby select the paper supply means accommodating the copy papers of the desired size.

* * * * *